United States Patent
Park et al.

(10) Patent No.: US 11,564,279 B2
(45) Date of Patent: Jan. 24, 2023

(54) METHOD OF OPERATING UE IN RELATION TO AS CONFIGURATION IN WIRELESS COMMUNICATION SYSTEM

(71) Applicant: LG Electronics Inc., Seoul (KR)

(72) Inventors: Giwon Park, Seoul (KR); Laeyoung Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 134 days.

(21) Appl. No.: 17/082,749

(22) Filed: Oct. 28, 2020

(65) Prior Publication Data

US 2021/0136861 A1 May 6, 2021

Related U.S. Application Data

(60) Provisional application No. 62/929,936, filed on Nov. 3, 2019.

(51) Int. Cl.
*H04W 76/27* (2018.01)
*H04W 76/30* (2018.01)

(52) U.S. Cl.
CPC .......... *H04W 76/27* (2018.02); *H04W 76/30* (2018.02)

(58) Field of Classification Search
CPC ..... H04W 76/27; H04W 76/30; H04W 76/19; H04W 76/34; H04W 76/18; H04W 4/40; H04W 4/44; H04W 76/11; H04W 76/14; H04W 76/36; H04W 92/18
See application file for complete search history.

(56) References Cited

U.S. PATENT DOCUMENTS

| | | | |
|---|---|---|---|
| 2018/0213575 A1 | 7/2018 | Chen | |
| 2020/0146082 A1* | 5/2020 | Chen | ............... H04W 4/40 |
| 2020/0260353 A1* | 8/2020 | Xu | ............... H04W 68/005 |
| 2020/0413467 A1* | 12/2020 | Pan | ............... H04W 72/04 |
| 2022/0060934 A1* | 2/2022 | Ying | ............... H04W 28/0875 |
| 2022/0150754 A1* | 5/2022 | Perras | ............... H04W 84/18 |
| 2022/0217575 A1* | 7/2022 | Wang | ............... H04W 76/14 |

FOREIGN PATENT DOCUMENTS

| | | |
|---|---|---|
| EP | 3726923 | 10/2020 |
| JP | 2020188460 | 11/2020 |

OTHER PUBLICATIONS

Huawei, HiSilicon, "Remaining issues on SLRB configuration," R2-1913712, 3GPP TSG-RAN WG2 Meeting #107 bis, ChongQing, China, dated Oct. 14-Oct. 18, 2019, 14 pages.
LG Electronics Inc., "[Running CR] Introduction of 5G V2X with NR Sidelink," R2-1907945, 3GPP TSG-RAN WG2#106, Reno, USA, dated May 13-17, 2019, 23 pages.

(Continued)

*Primary Examiner* — Will W Lin
(74) *Attorney, Agent, or Firm* — Fish & Richardson P.C.

(57) ABSTRACT

A method of operating a first user equipment (UE) in a wireless communication system is disclosed. The method includes performing an access stratum (AS) configuration procedure with a second UE by the first UE, and transmitting a radio resource control (RRC) message to a base station (BS) based on failure of the AS configuration procedure by the first UE. The RRC message includes information about a destination identifier (ID) of a unicast link related to the failure of the AS configuration procedure.

8 Claims, 22 Drawing Sheets

(56) References Cited

OTHER PUBLICATIONS

OPPO, "Left issues on PC5-RRC based AS layer configuration procedure," R2-1912073, 3GPP TSG-RAN WG2 Meeting #107bis, Chongqing, China, dated Oct. 14-Oct. 18, 2019, 8 pages.
PCT International Search Report and Written Opinion in International Appln. No. PCT/KR2020/014227, dated Mar. 31, 2021, 23 pages (with English translation).
Samsung, "AS-layer configuration failure case in SL unicast," R2-1912441, 3GPP TSG-RAN WG2 Meeting #107bis, Chongqing, China, dated Oct. 14-18, 2019, 4 pages.
ASUSTeK, "Correction on RRC reconfiguration failure for SL," R2-2010422, Presented at 3GPP TSG-RAN WG2 Meeting #112 electronic, Online, Nov. 2-13, 2020, 10 pages.
Ericsson, "Discussion on SL information reporting over Un," R2-1913324, 3GPP TSG-RAN WG2 #107bis, Chongqing, China, Oct. 14-18, 2019, 5 pages.
Office Action in Japanese Appln. No. 2020-182250, dated Oct. 26, 2021, 8 pages (with English translation).
OPPO, "Miscellaneous issues on PC5-RRC," R2-1912078, Presented at 3GPP TSG-RAN WG2 Meeting #107bis, Chongqing, China, Oct. 14-Oct. 18, 2019, 10 pages.
ZTE & Sanechips, "Further discussion on sidelink RLC AM and UM for unicast," R2-1914547, 3GPP TSG RAN WG2 Meeting #108, Reno ,USA, Nov. 18-22, 2019, 7 pages.
LG Electronics, "[Running CR] Introduction of 5G V2X with NR Sidelink," R2-1907945, 3GPP TSG-RAN WG2#106, Reno, USA, May 13-17, 2019, 21 pages.
Extended European Search Report in European Appln. No. 20204270.1, dated Mar. 2, 2021, 12 pages.
Ericsson (Rapporteur), "Summary of email discussion [107#75][NR/V2X] RLF," R2-1913328, 3GPP TSG-RAN WG2 #107bis, Chongqing, China, dated Oct. 14-18, 2019, 26 pages.
Ericsson, "Discussion on SL AS configuration request over NR Uu," R2-1910132, 3GPP TSG-RAN WG2 #107, Prague, Czech Republic, dated Aug. 26-30, 2019, 3 pages.
Huawei, HiSilicon, "Potential AS layer impacts on SL connection setup and configuration in Unicast," R2-1816517, 3GPP TSG-RAN WG2 # 104, Spokane, USA, dated Nov. 12-16, 2018, 4 pages.
OPPO, "Left issues on PC5-RRC based AS layer configuration procedure," R2-1912073, 3GPP TSG-RAN WG2 Meeting #107bis, Chongqing, China, dated Oct. 14-Oct. 18, 2019, 6 pages.
Samsung, "AS-layer configuration failure case in SL unicast," R2-1911324, 3GPP TSG-RAN WG2 Meeting #107, Prague, Czech Republic, dated Aug. 26-30, 2019, 2 pages.
Samsung, "AS-layer configuration failure case in SL unicast," R2-1912441 (Resub. Of R2-1911324), 3GPP TSG-RAN WG2 Meeting #107bis, Chongqing, China, dated Oct. 14-18, 2019, 2 pages.
Vivo, "Open issues for Sidelink link failure and release," R2-1905845, 3GPP TSG-RAN WG2 Meeting #106, Reno, USA, dated May 13-17, 2019, 3 pages.
Office Action in Japanese Appln. No. 2020-182250, dated Mar. 8, 2022, 11 pages (with English translation).
Vivo, "Clarification of QoS info in accept message," S2-2005241, Presented at SA WG2 Meeting #S2-140e, E-Meeting, Aug. 19-Sep. 1, 2020, 9 pages.

\* cited by examiner

METHOD OF OPERATING UE IN RELATION TO AS CONFIGURATION IN WIRELESS COMMUNICATION SYSTEM

CROSS-REFERENCE TO RELATED APPLICATION

This application claims the benefit of U.S. Provisional Application No. 62/929,936, filed on Nov. 3, 2019, which is hereby incorporated by reference as if fully set forth herein.

BACKGROUND

Field

The present disclosure relates to a wireless communication system, and more particularly, to a method and apparatus for operating a user equipment (UE) in relation to release of an access stratum (AS) configuration procedure.

Discussion of the Related Art

Wireless communication systems employ various radio access technologies (RATs) such as long term evolution (LTE), LTE-advanced (LTE-A), and wireless fidelity (WiFi). $5^{th}$ generation (5G) is also included in the RATs. Three key requirement areas of 5G are (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

SUMMARY

Embodiment(s) relates to an operation of a sidelink user equipment (UE), when an access stratum (AS) configuration is failed. Provided is a method of reporting an AS configuration failure to a base station (BS).

Additional aspects will be set forth in part in the description which follows and, in part, will be apparent from the description, or may be learned by practice of the presented embodiments of the disclosure.

According to an embodiment, a method of operating a first UE in a wireless communication system includes performing an AS configuration procedure with a second UE by the first UE, and transmitting a radio resource control (RRC) message to a BS based on failure of the AS configuration procedure by the first UE. The RRC message includes information about a destination identifier (ID) of a unicast link related to the failure of the AS configuration procedure.

According to an embodiment, a method of operating a BS in a wireless communication system includes receiving an RRC message from a first UE based on failure of an AS configuration procedure by the BS. The RRC message includes information about a destination ID of a unicast link related to the failure of the AS configuration procedure.

According to an embodiment, a first UE in a wireless communication system includes at least one processor and at least one computer memory operatively coupled to the at least one processor and storing instructions which when executed, cause the at least one processor to perform operations. The operations includes performing an AS configuration procedure with a second UE, and transmitting an RRC message to a BS based on failure of the AS configuration procedure, and the RRC message includes information about a destination ID of a unicast link related to the failure of the AS configuration procedure.

According to an embodiment, a BS in a wireless communication system includes at least one processor and at least one computer memory operatively coupled to the at least one processor and storing instructions which when executed, cause the at least one processor to perform operations. The operations include receiving an RRC message from a first UE based on failure of an AS configuration procedure, and the RRC message includes information about a destination ID of a unicast link related to the failure of the AS configuration procedure.

According to an embodiment, a processor for performing operations for a UE in a wireless communication system is provided. The operations include performing an AS configuration procedure with a second UE, and transmitting an RRC message to a BS based on failure of the AS configuration procedure, and the RRC message includes information about a destination ID of a unicast link related to the failure of the AS configuration procedure.

According to an embodiment, a non-volatile computer-readable storage medium storing at least one computer program, the at least one computer program including instructions which when executed by at least one processor, cause the at least one processor to perform operations for a UE is provided. The operations include performing an AS configuration procedure with a second UE, and transmitting an RRC message to a BS based on failure of the AS configuration procedure, and the RRC message includes information about a destination ID of a unicast link related to the failure of the AS configuration procedure.

The first UE may release a PC5 RRC connection from the second UE based on the failure of the AS configuration procedure.

The RRC message may be SidelinkUEInformation.

The information about the destination ID may correspond to the second UE.

The first UE may communicate with at least one of another UE, a UE or BS related to an autonomous driving vehicle, or a network.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, $5^{th}$ generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
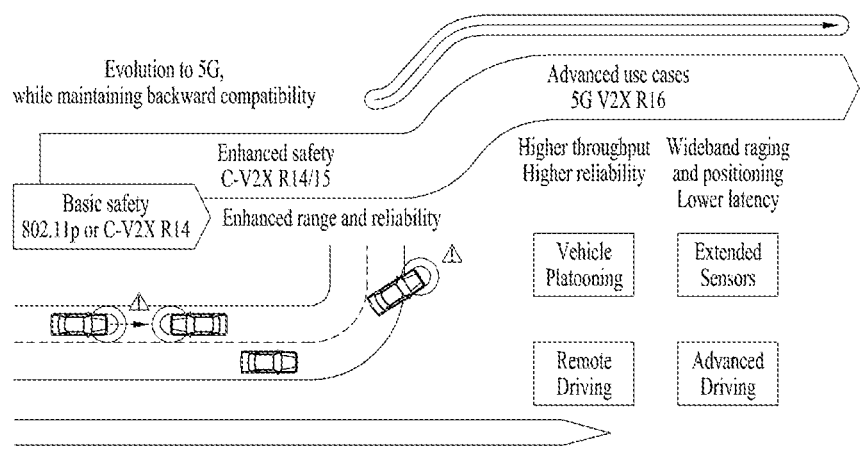
FIG. 1 is a diagram comparing vehicle-to-everything (V2X) communication based on pre-new radio access technology (pre-NR) with V2X communication based on NR.
Figure 2:
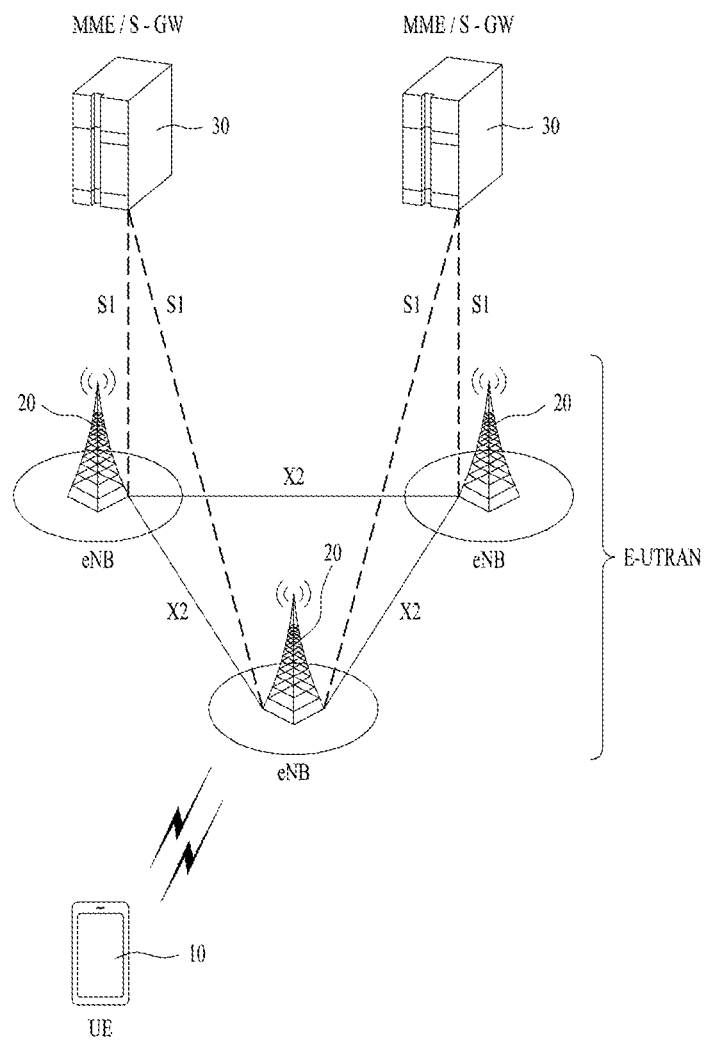
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figures 3A, 3B:
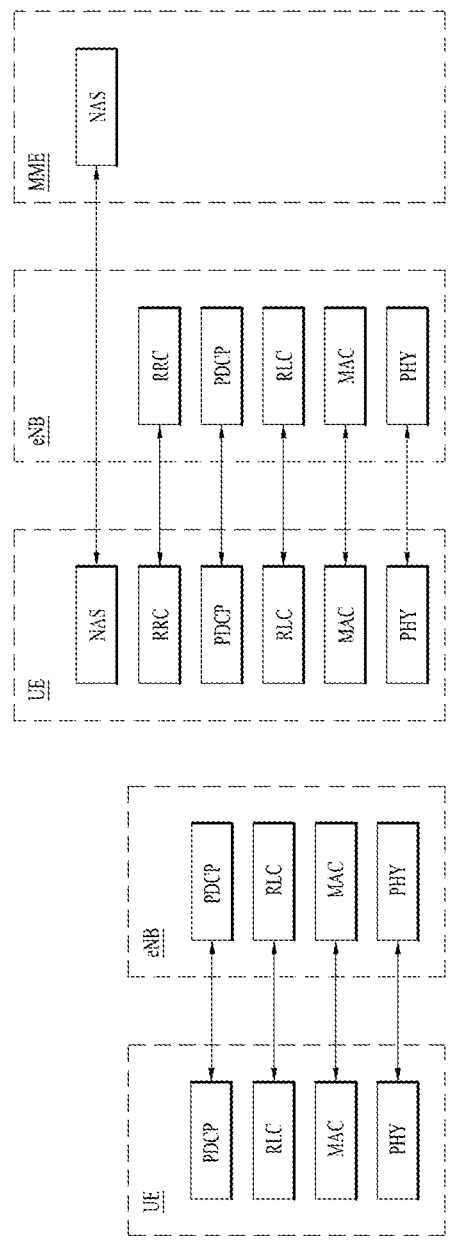
FIGS. 3A and 3B are diagrams illustrating user-plane and control-plane radio protocol architectures according to an embodiment of the present disclosure.

FIG. 3A illustrates a user-plane radio protocol architecture according to an embodiment of the disclosure.

FIG. 3B illustrates a control-plane radio protocol architecture according to an embodiment of the disclosure. A user plane is a protocol stack for user data transmission, and a control plane is a protocol stack for control signal transmission.

Referring to FIGS. 3A and 3B, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB. DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
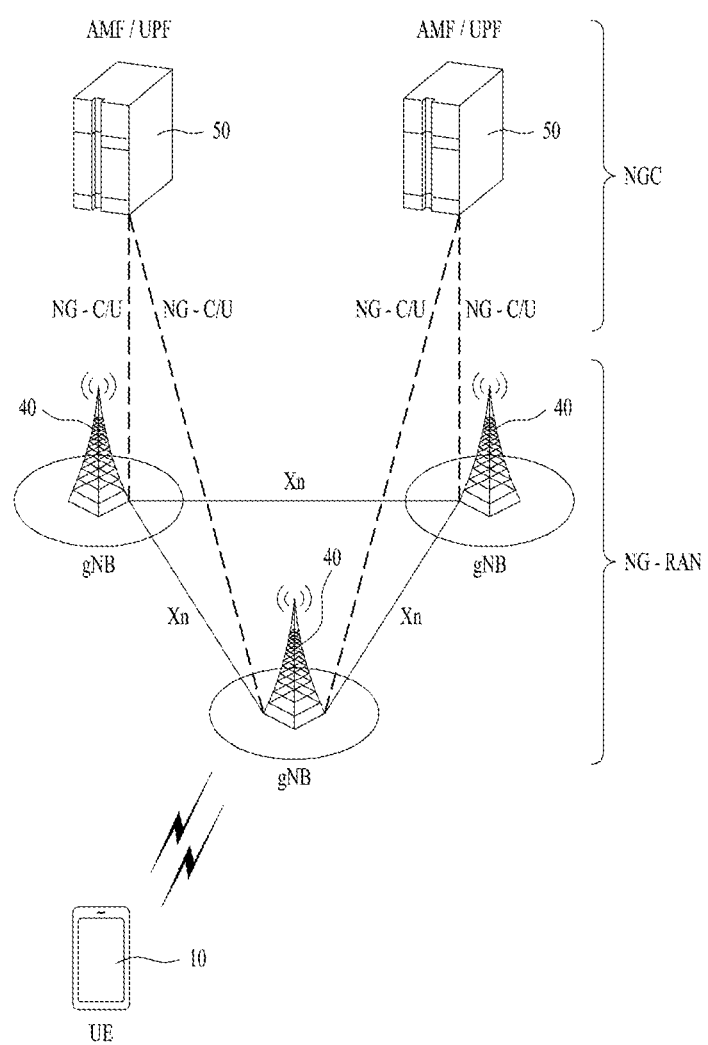
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
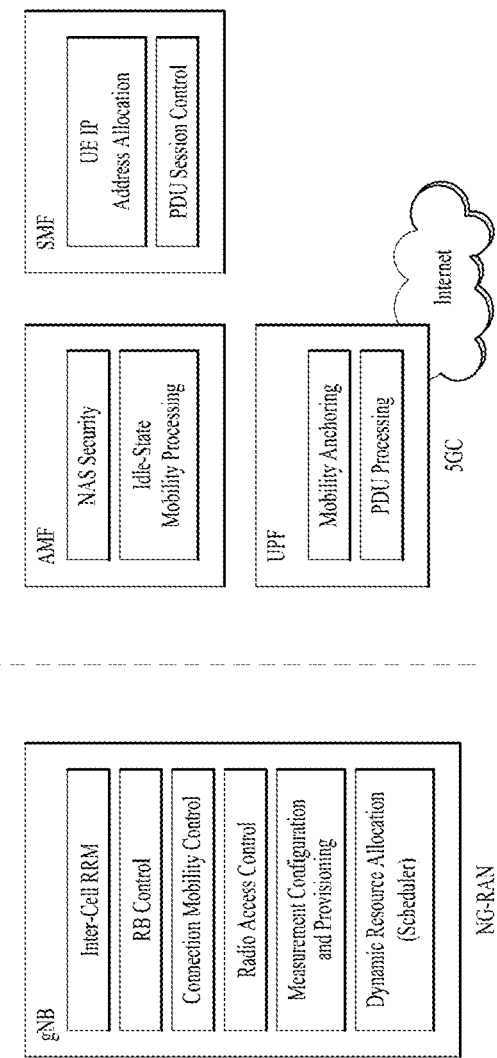
FIG. 5 is a diagram illustrating functional split between a next generation radio access network (NG-RAN) and a $5^{th}$ generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
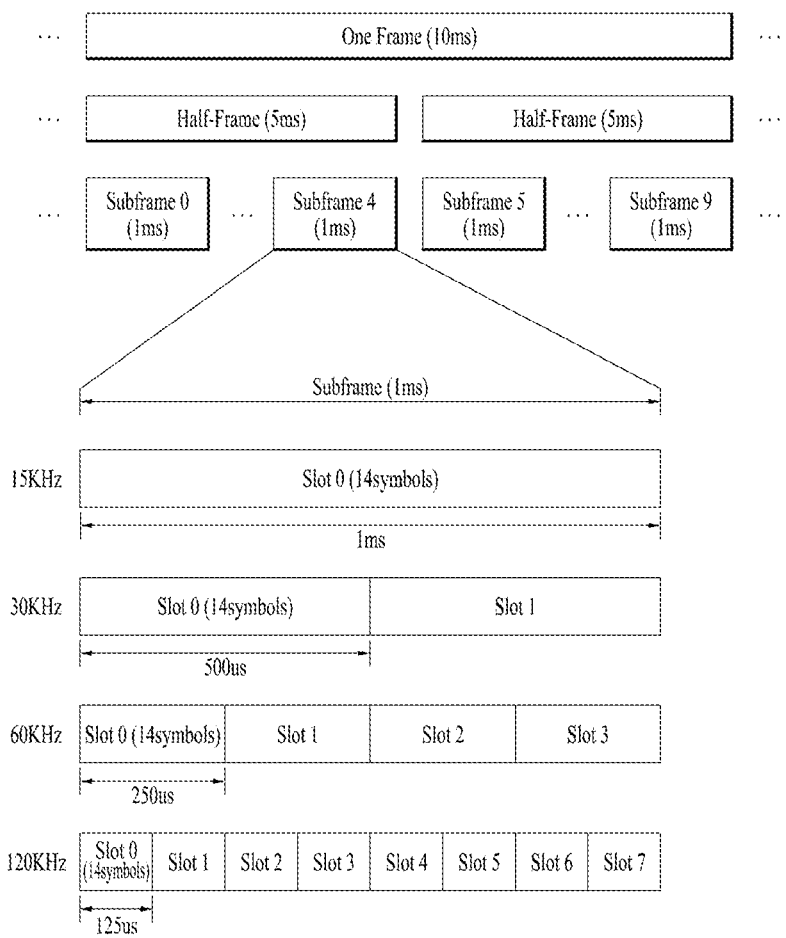
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

[Table 1] below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration $\mu$ in the NCP case.

TABLE 1

| SCS (15*2u) | $N^{slot}_{symb}$ | $N^{frame,\,u}_{slot}$ | $N^{subframe,\,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

[Table 2] below lists the number of symbols per slot, the number of slots per frame, and the number of slots per subframe according to an SCS in the ECP case.

TABLE 2

| SCS (15*2^u) | $N^{slot}_{symb}$ | $N^{frame,\,u}_{slot}$ | $N^{subframe,\,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
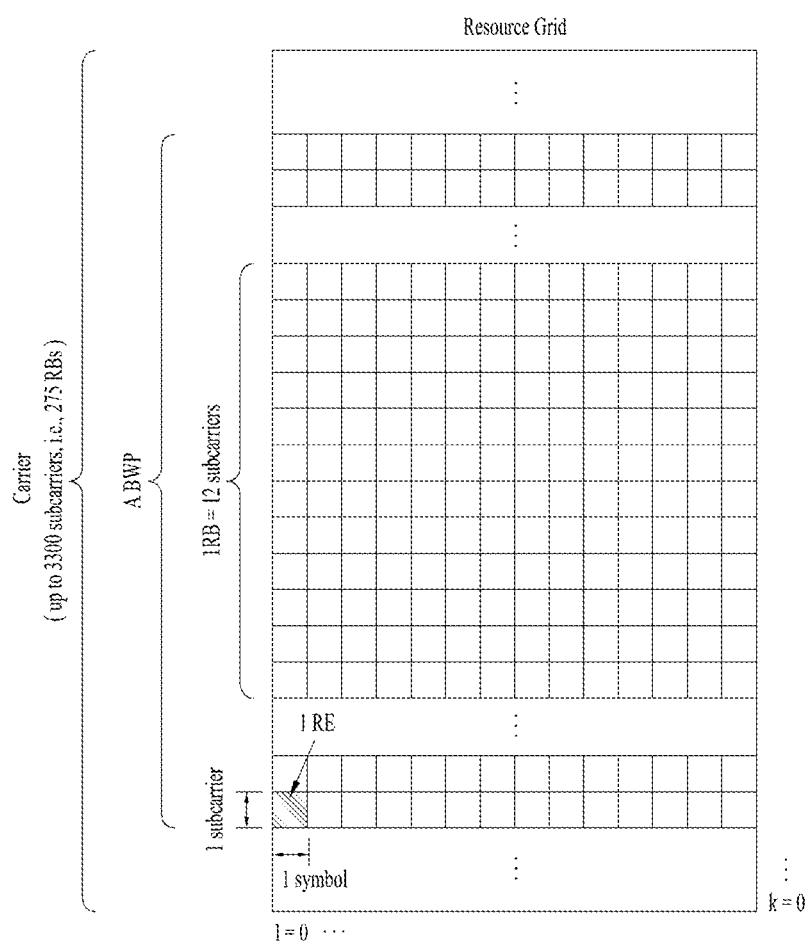
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8A:
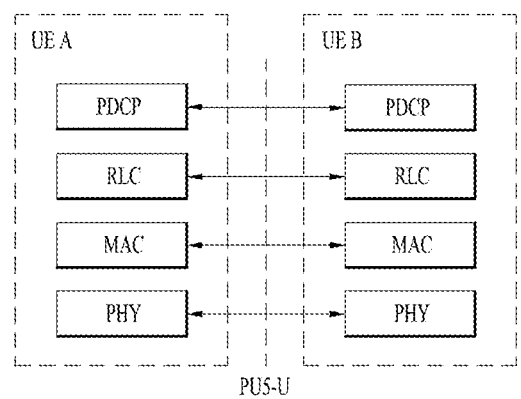
FIGS. 8A and 8B are diagrams illustrating radio protocol architectures for sidelink (SL) communication according to an embodiment of the present disclosure.
Figure 8B:
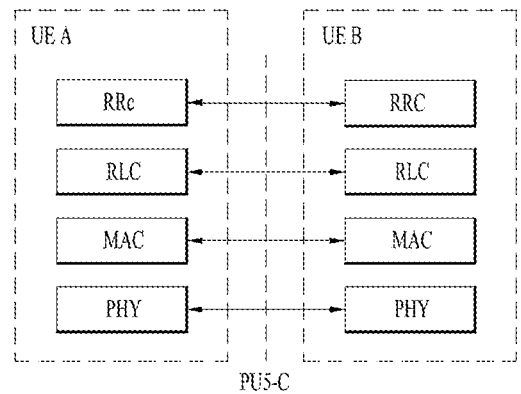

FIGS. 8A and 8B illustrate a radio protocol architecture for SL communication according to an embodiment of the present disclosure. Specifically, FIG. 8A illustrates a user-plane protocol stack in LTE, and FIG. 8B illustrates a control-plane protocol stack in LTE.

Figure 9A:
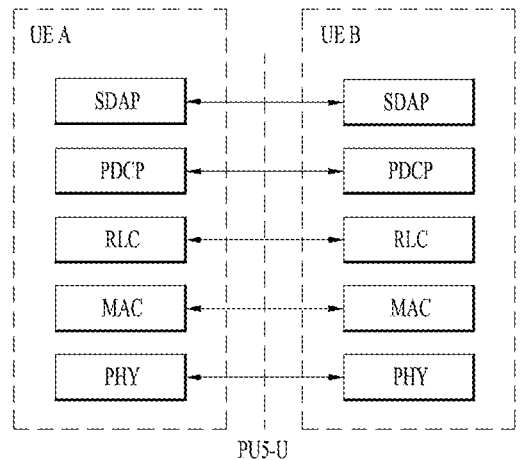
FIGS. 9A and 9B are diagrams illustrating radio protocol architectures for SL communication according to an embodiment of the present disclosure.
Figure 9B:
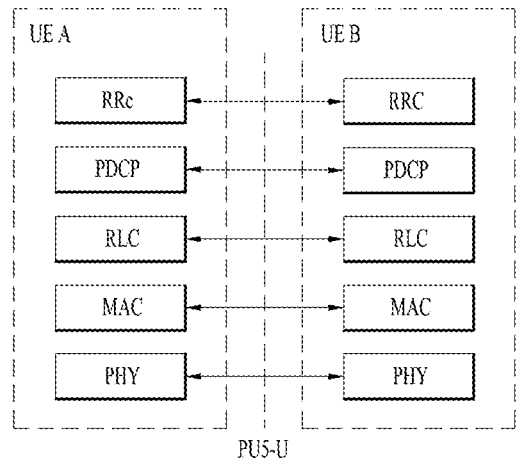

FIGS. 9A and 9B illustrate a radio protocol architecture for SL communication according to an embodiment of the present disclosure. Specifically, FIG. 9A illustrates a user-plane protocol stack in NR, and FIG. 9B illustrates a control-plane protocol stack in NR. A description will be given of SL resource allocation.

Resource allocation in SL will be described below.

Figures 10A, 10B:
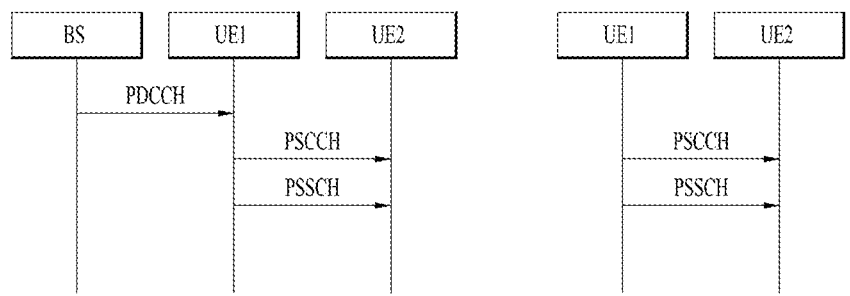
FIGS. 10A and 10B are diagrams illustrating the structure of a secondary synchronization signal block (S-SSB) in a normal cyclic prefix (NCP) case according to an embodiment of the present disclosure.

FIGS. 10A and 10B illustrate a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 10A illustrates a UE operation related to LTE transmission mode 1 or LTE transmission mode 3. Alternatively, for example, FIG. 10A illustrates a UE operation related to NR resource allocation mode 1. For example, LTE transmission mode 1 may be applied to general SL communication, and LTE transmission mode 3 may be applied to V2X communication.

For example, FIG. 10B illustrates a UE operation related to LTE transmission mode 2 or LTE transmission mode 4. Alternatively, for example, FIG. 10B illustrates a UE operation related to NR resource allocation mode 2.

Referring to FIG. 10A, in LTE transmission mode 1, LTE transmission mode 3, or NR resource allocation mode 1, a BS may schedule SL resources to be used for SL transmission of a UE. For example, the BS may perform resource scheduling for UE 1 through a PDCCH (more specifically, DL control information (DCI)), and UE 1 may perform V2X or SL communication with UE 2 according to the resource scheduling. For example, UE 1 may transmit sidelink control information (SCI) to UE 2 on a PSCCH, and then transmit data based on the SCI to UE 2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 10B, in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE 1, which has autonomously selected resources in a resource pool, may transmit SCI to UE 2 on a PSCCH and then transmit data based on the SCI to UE 2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE 1 may indicate the priority of SL transmission to UE 2 by SCI. For example, UE 2 may decode the SCI and perform sensing and/or resource (re)selection based on the priority. For example, the resource (re)selection procedure may include identifying candidate resources in a resource selection window by UE 2 and selecting resources for (re)transmission from among the identified candidate resources by UE 2. For example, the resource selection window may be a time interval during which the UE selects resources for SL transmission. For example, after UE 2 triggers resource (re)selection, the resource selection window may start at T1≥0, and may be limited by the remaining packet delay budget of UE 2. For example, when specific resources are indicated by the SCI received from UE 1 by the second UE and an L1 SL reference signal received power (RSRP) measurement of the specific resources exceeds an SL RSRP threshold in the step of identifying candidate resources in the resource selection window by UE 2, UE 2 may not determine the specific resources as candidate resources. For example, the SL RSRP threshold may be determined based on the priority of SL transmission indicated by the SCI received from UE 1 by UE 2 and the priority of SL transmission in the resources selected by UE 2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

- PSSCH-related and/or PSCCH-related resource allocation information, for example, the positions/number of time/frequency resources, resource reservation information (e.g. a periodicity), and/or
- an SL channel state information (CSI) report request indicator or SL (L1) RSRP (and/or SL (L1) reference signal received quality (RSRQ) and/or SL (L1) received signal strength indicator (RSSI)) report request indicator, and/or
- an SL CSI transmission indicator (on PSSCH) (or SL (L1) RSRP (and/or SL (L1) RSRQ and/or SL (L1) RSSI) information transmission indicator), and/or
- MCS information, and/or
- transmission power information, and/or
- L1 destination ID information and/or L1 source ID information, and/or
- SL HARQ process ID information, and/or
- new data indicator (NDI) information, and/or
- redundancy version (RV) information, and/or
- QoS information (related to transmission traffic/packet), for example, priority information, and/or
- an SL CSI-RS transmission indicator or information about the number of SL CSI-RS antenna ports (to be transmitted);
- location information about a transmitting UE or location (or distance area) information about a target receiving UE (requested to transmit an SL HARQ feedback), and/or
- RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 11:
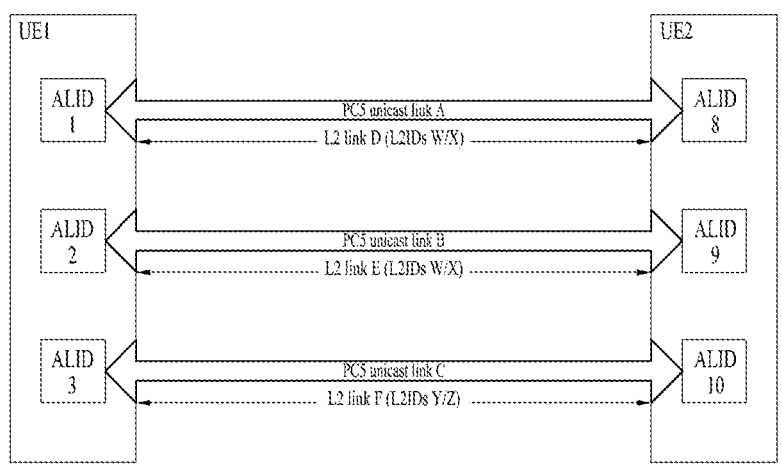
FIGS. 11, 12, 13, 14, and 15 are diagrams illustrating embodiment(s)

In NR V2X, although a UE has multiple different application identifiers (ALIDs), the UE may have the same Layer 2 (L2) ID for different ALIDs. As illustrated in FIG. 11, for example, PC5 unicast link A and PC5 unicast link B between UE 1 and UE 2 may have different ALIDs but the same pair of a source L2 ID and a destination L2 ID. That is, PC5 unicast link A and PC5 unicast link B may have the same source L2 ID, W and the same destination L2 ID, X in the example of FIG. 11.

In this case, upon occurrence of sidelink radio link failure (SL RLF) for PC5 unicast link A, a UE (e.g., Tx UE or Rx UE) reports information about the SL RLF to a higher layer (V2X layer) and a BS. For example, the information about the SL RLF may be information notifying or indicating that RLF has occurred to the PC5 unicast link or PC5 RRC connection. For example, the information about the SL RLF may include the destination L2 ID. Alternatively, for example, the information about the SL RLF may include both the source L2 ID and the destination L2 ID. In various embodiments of the present disclosure, information about SL RLF may be referred to as an SL RLF indication or an RLF indication. In various embodiments of the present disclosure, SL RLF may be referred to as PC5 RLF or RLF.

However, when the UE has established a plurality of PC5 unicast links or a plurality of PC5 RRC connections as in the example of FIG. 11, the PC5 unicast links may have the same source L2 ID and/or the same destination L2 ID. Therefore, the higher layer (V2X layer) of the UE or the BS may not identify the PC5 unicast link to which the SL RLF has occurred among the plurality of PC5 unicast links, although the higher layer or the BS has received a report of the SL RLF indication. For example, even though the higher layer (e.g., V2X layer) of the UE or the BS has received information about SL RLF including an L2 ID, W and/or an L2 ID, Z, the higher layer (e.g., V2X layer) of the UE or the BS may not identify the PC5 unicast link to which the SL RLF has occurred between PC5 unicast link A and PC5 unicast link B.

Therefore, upon occurrence of SL RLF to a PC5 unicast link, the AS layer of the UE should transmit, to the higher layer (e.g., V2X layer) of the UE, a PC5 unicast link ID (or a PC5 link ID) of the PC5 unicast link, which enables the PC5 unicast link to be uniquely identified by a source L2 ID and/or destination L2 ID. For example, the AS layer of the UE should transmit L2 link D, L2 link E, and L2 link F to the higher layer (e.g., V2X layer) of the UE in the example of FIG. 11. Alternatively, upon occurrence of SL RLF to a PC5 unicast link, the AS layer of the UE should transmit, to the BS, a PC5 unicast link ID of the PC5 unicast link, which enables the PC5 unicast link to be uniquely identified by a source L2 ID and/or destination L2 ID. For example, the AS layer of the UE should transmit L2 link D, L2 link E, and L2 link F to the BS in the example of FIG. 11. For example, the PC5 unicast link IDs may be IDs that identify the PC5 unicast links, which have been received from the V2X layer of the UE by the AS layer of the UE.

Accordingly, a method and apparatus for operating a UE, upon occurrence of SL RLF to a PC5 unicast link among a plurality of PC5 unicast links according to various embodiment of the present disclosure are proposed below. The various embodiments of the present disclosure may be implemented in combination with a transmission and reception operation in a BW and/or a synchronization operation of a UE. One or more of the following embodiments may be implemented in combination.

Figure 12:
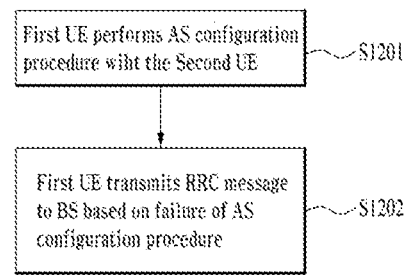

According to an embodiment, a first UE (UE 1) may perform an access stratum (AS) configuration procedure with a second UE (UE 2) (S1201 in FIG. 12). Based on failure of the AS configuration procedure, UE 1 may transmit an RRC message to a BS (S1202 in FIG. 12). The RRC message may include destination ID information about a PC5 unicast link related to the AS configuration procedure failure. The RRC message may be SidelinkUEInformation, and the destination ID information may correspond to UE 2.

Upon receipt of the RRC message, the BS may identify the PC5 unicast link for which the AS configuration procedure has been failed from the destination ID information. The BS may also release all of radio resources related to the PC5 unicast link. For example, For example, the radio resources may include mode 1 resources and/or mode 2 resources. For example, the mode 1 resources may be resources that the BS has allocated to the UE, for SL communication, and the mode 2 resources may be resources that the UE has allocated or selected for the SL communication.

UE 1 may release a PC5 RRC connection from UE 2 based on the failure of the AS configuration procedure. In this case, the RRC message may include information indicating that the AS configuration procedure has been failed. More specifically, when the AS configuration procedure starts, a T400 timer starts. Upon expiration of the T400 timer, UE 1 releases a DRB, an SRB, and a PC5 RRC connection, considering that SLF has occurred. Further, UE 1 transmits SidelinkUEInformation with cause information set to RLF to the BS.

Further, when UE 1 receives an RRC reconfiguration failure message from UE 2, UE 1 may stop the T400 timer. In this case, UE 1 may transmit SidelinkUEInformation with cause information, that is, information indicating the failure of the AS configuration procedure to the BS.

Figure 13:
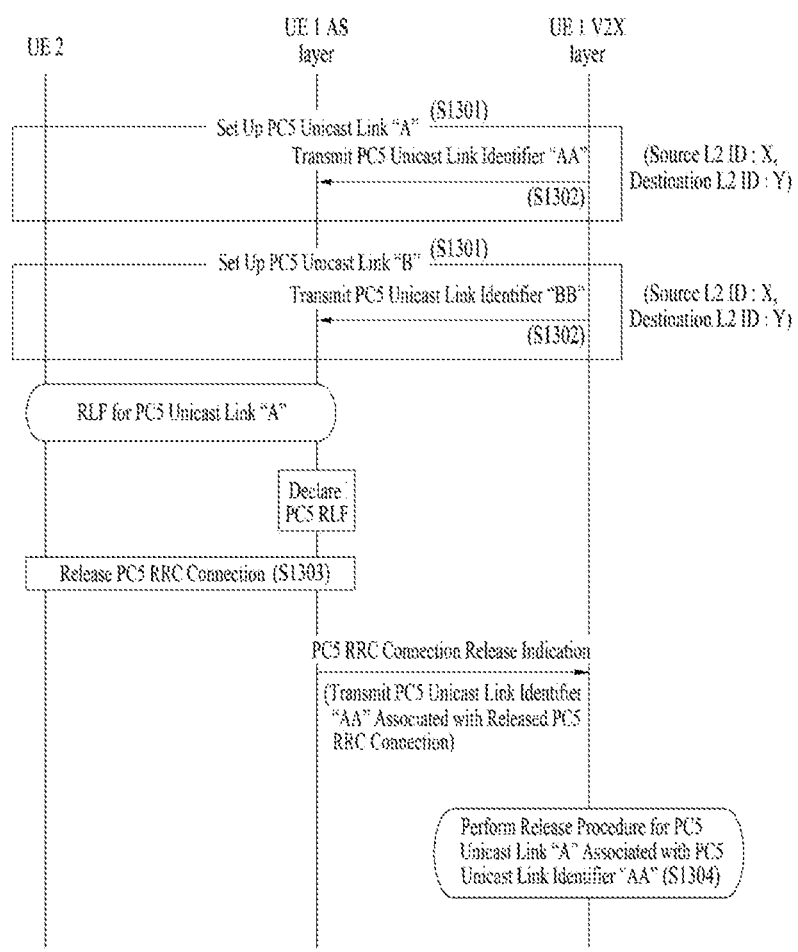

FIG. 13 is a diagram illustrating a signal flow for a method of releasing a PC5 RRC connection and reporting the release of the PC5 RRC connection to a higher layer by a UE and thus releasing a PC5 unicast link by the higher layer according to an embodiment of the present disclosure.

Referring to FIG. 13, a first UE (UE 1) and a second UE (UE 2) may set up/establish a plurality of PC5 unicast links in operation S1301. PC5 unicast link "A" and PC5 unicast link "B" may have the same source L2 ID, X and the same destination L2 ID, Y. UE 1 may be a source UE and UE 2 may be a destination UE.

In operation S1302, a higher layer of UE 1 may transmit an ID identifying PC5 unicast link "A" uniquely, that is, PC5 unicast link ID "AA" to the AS layer of UE 1. Further, the higher layer of UE 1 may transmit an ID identifying PC5 unicast link "B" uniquely, that is, PC5 unicast link ID "BB" to the AS layer of UE 1. For example, the higher layer may be a V2X layer. According to an embodiment of the present disclosure, even though a plurality of PC5 unicast links have the same source L2 ID and/or the same destination L2 ID, the AS layer of the UE may distinguish the PC5 unicast links having the same source L2 ID and/or the same destination L2 ID from each other based on PC5 unicast link IDs received from the higher layer of the UE.

Upon occurrence of RLF to PC5 unicast link "A", the AS layer of UE 1 may release a PC5 RRC connection of PC5 unicast link "A" to which the RLF has occurred in operation S1303. The AS layer of UE 1 may also transmit a "PC5 RRC connection release" indication to the V2X layer. For example, the "PC5 RRC connection release" indication may be an indication/information by which the AS layer of the UE indicates the release of the PC5 RRC connection to the higher layer of the UE. For example, the "PC5 RRC connection release" indication may include information about a PC5 unicast link ID identifying a PC5 unicast link associated with the PC5 RRC connection which has been released due to the RLF.

In operation S1304, the higher layer of UE 1 may check the "PC5 RRC connection release" indication received from the AS layer of UE 1. The higher layer of UE 1 may release a PC5-S connection mapped to the PC5 unicast link ID. That is, the higher layer of UE 1 may release the PC5 unicast link mapped to the PC5 unicast link ID.

UE 1 may transmit, to the BS, information about the PC5 unicast link for which the SL RLF has been declared and thus the PC5 RRC connection has been released. A related embodiment will be described below.

Once a UE (e.g., Tx UE or Rx UE) declares RLF for a PC5 unicast link, the UE may immediately releases a PC5 RRC connection to which the SL RLF has occurred and transmit a "PC5 RRC connection release (or PC5 RLF indication)" message including information about the PC5 unicast link associated with the PC5 RRC connection released due to the PC5 RLF to the BS. For example, the information about the PC5 unicast link may be an ID identifying the PC5 unicast link uniquely. For example, the information about the PC5 unicast link may include at least one of the PC5 unicast link ID, a source L2 ID associated with the PC5 unicast link ID, a destination L2 ID associated with the PC5 unicast link ID, an ALID of a source UE associated with the PC5 unicast link ID, and/or an ALID of a destination UE associated with the PC5 unicast link ID. Alternatively, the information about the PC5 unicast link may include all of the above information. For example, the "PC5 RRC connection release" message may be transmitted in an RRC message. For example, the RRC message may be a Sidelink UE Information message or a new RRC message.

Upon receipt of the "PC5 RRC connection release" message including the information about the PC5 unicast link from the UE, the BS may release all of radio resources associated with the PC5 unicast link. For example, the radio resources may include mode 1 resources and/or mode 2 resources. For example, the mode 1 resources may be resources that the BS has allocated to the UE, for SL communication, and the mode 2 resources may be resources that the UE has allocated or selected for the SL communication.

Figure 14:
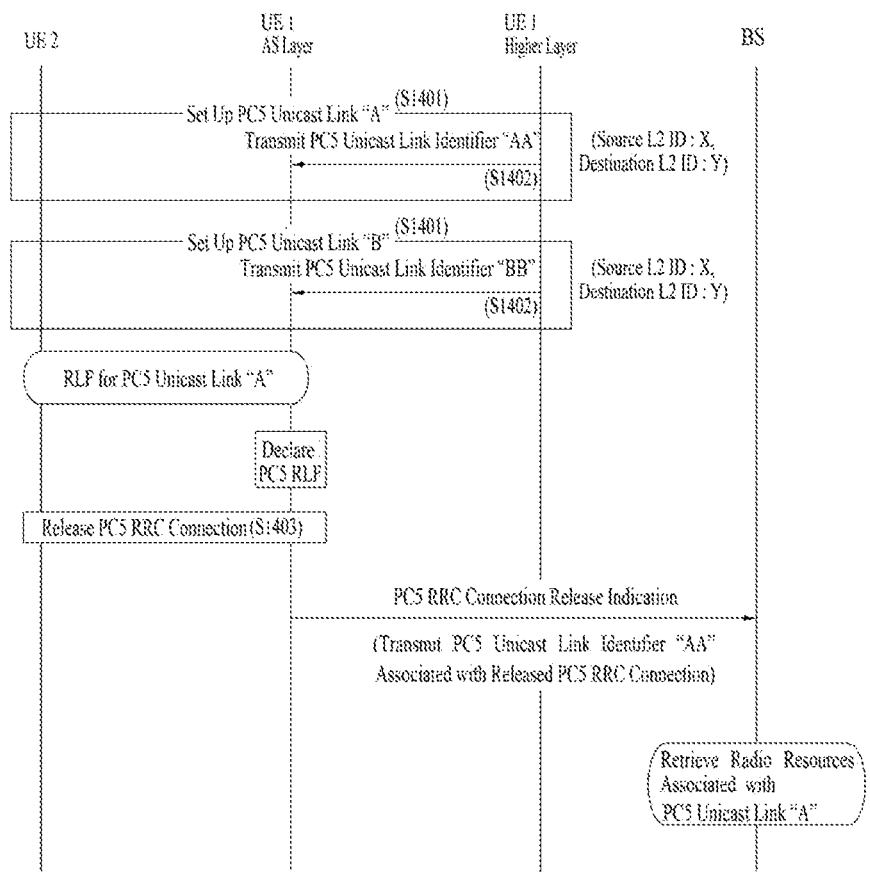

FIG. 14 is a diagram illustrating a method of releasing a PC5 RRC connection and reporting the release of the PC5 RRC connection to a BS by a UE and releasing radio resources from the UE by the BS according to an embodiment of the present disclosure.

Referring to FIG. 14, UE 1 and UE 2 may set up/establish a plurality of PC5 unicast links in operation S1401. PC5 unicast link "A" and PC5 unicast link "B" may have the same source L2 ID, X and the same destination L2 ID, Y. UE 1 may be a source UE and UE 2 may be a destination UE.

In operation S1402, a higher layer of UE 1 may transmit an ID identifying PC5 unicast link "A" uniquely, that is, PC5 unicast link ID "AA" to the AS layer of UE 1. Further, the higher layer of UE 1 may transmit an ID identifying PC5 unicast link "B" uniquely, that is, PC5 unicast link ID "BB" to the AS layer of UE 1. For example, the higher layer may be a V2X layer. According to an embodiment of the present disclosure, even though a plurality of PC5 unicast links have the same source L2 ID and/or the same destination L2 ID, the AS layer of the UE may distinguish the PC5 unicast links having the same source L2 ID and/or the same destination L2 ID from each other based on PC5 unicast link IDs received from the higher layer of the UE.

Upon occurrence of RLF to PC5 unicast link "A", UE 1 may transmit a "PC5 RRC connection release indication" message to the BS in operation S1403. For example, the PC5 RRC connection release indication may be an indication/information by which UE 1 indicates the release of a PC5 RRC connection to the BS. For example, the "PC5 RRC connection release indication" message may include information about a PC5 unicast link ID identifying the PC5 unicast link associated with the PC5 RRC connection which has been released due to the SL RLF. In the embodiment of FIG. 14, for example, the "PC5 RRC connection release indication" message may include information about a PC5 unicast link ID identifying PC5 unicast link "A" associated with the PC5 RRC connection released due to the SL RLF. For example, the "PC5 RRC connection release indication" message may include at least one of the PC5 unicast link ID associated with the PC5 RRC connection released due to the SL RLF, a source L2 ID associated with the PC5 unicast link ID, a destination L2 ID associated with the PC5 unicast link ID, an ALID of a source UE associated with the PC5 unicast link ID, and/or an ALID of a destination UE associated with the PC5 unicast link ID. For example, the "PC5 RRC connection release indication" message may include all of the above information.

In operation S1404, the BS may retrieve or release all of radio resources allocated to PC5 unicast link "A" (e.g., mode 1 resources and/or mode 2 resources).

Now, a description will be given of release of a PC5 RRC connection that occurs for a reason other than SL RLF. When a PC5 RRC connection is released for a reason other than SL RLF among the two or more PC5 RRC connections, UE 1 may transmit information about a PC5 unicast link associated with the PC5 RRC connection to the BS. When the AS layer of the UE releases a PC5 RRC connection for a PC5 unicast link for a reason other than PC5 RLF, the AS layer of the UE may transmit information (or an indication) about the PC5 unicast link associated with the released PC5 RRC connection to the higher layer of the UE.

The reason other than SL (or PC5) RLF, for example, a cause other than PC5 RLF, which leads to the UE's release of a PC5 RRC connection for a PC5 unicast link may be any of the following causes:

PC5 RRC resume failure;
PC5 RRC connection failure;
PC5 RRC suspension;
load balancing required for PC5 interface;
mismatch between UE capabilities of UEs (e.g., a Tx UE and a peer Rx UE); and AS layer configuration failure between UEs (e.g., a Tx UE and a peer Rx UE).

For example, the higher layer may be the V2X layer in the proposal. For example, the information about the PC5 unicast link may be an ID that uniquely identifies the PC5 unicast link. For example, the information about the PC5 unicast link may include at least one of a PC5 unicast link ID, a source L2 ID associated with the PC5 unicast link ID, a destination L2 ID associated with the PC5 unicast link ID, an ALID of a source UE associated with the PC5 unicast link ID, and/or an ALID of a destination UE associated with the PC5 unicast link ID. For example, the information about the PC5 unicast link may include all of the above information.

For example, upon receipt of a report of an indication including the information about the PC5 unicast link associated with the PC5 RRC connection from the AS layer of the UE, the higher layer of the UE may release a PC5-S connection associated with the PC5 unicast link ID. That is, the higher layer may release the PC5 unicast link associated with the PC5 RRC connection.

In relation to the above description, when the AS layer of the UE releases a PC5 RRC connection for a PC5 unicast link for a reason other than PC5 RLF, the AS layer of the UE may transmit a "PC5 RRC connection release" message including information about the PC5 unicast link associated with the released PC5 RRC connection to the BS. The reason other than PC5 RLF may be any of PC5 RRC resume failure, PC5 RRC connection failure, PC5 RRC suspension, load balancing required for PC5 interface, mismatch between the UE capabilities of UEs (e.g., a Tx UE and a peer Rx UE), and AS layer configuration failure between UEs (e.g., a Tx UE and a peer Rx UE).

Further, the information about the PC5 unicast link may be, for example, an ID identifying the PC5 unicast link uniquely. For example, the information about the PC5 unicast link may include at least one of a PC5 unicast link ID, a source L2 ID associated with the PC5 unicast link ID, a destination L2 ID associated with the PC5 unicast link ID, an ALID of a source UE associated with the PC5 unicast link ID, and/or an ALID of a destination UE associated with the PC5 unicast link ID. For example, the information about the PC5 unicast link may include all of the above information.

For example, the "PC5 RRC connection release" message may be transmitted in an RRC message. For example, the RRC message may be a Sidelink UE Information message or a new RRC message.

Upon receipt of the "PC5 RRC connection release" message including the information about the PC5 unicast link from the UE, the BS may release all of radio resources associated with the PC5 unicast link. For example, the radio resources may include mode 1 resources and/or mode 2 resources. For example, the mode 1 resources may be resources that the BS has allocated to the UE, for SL communication, and the mode 2 resources may be resources that the UE has allocated or selected for the SL communication.

When the AS layer of the UE determines to release a PC5 RRC connection for a PC5 unicast link for a reason other than PC5 RLF, the AS layer of the UE may transmit information (or an indication) about the PC5 unicast link associated with the PC5 RRC connection determined to be released to the higher layer of the UE. The reason other than PC5 RLF has been described before. Further, the higher layer may be the V2X layer in the proposal. For example, the information about the PC5 unicast link may include at least one of a PC5 unicast link ID, a source L2 ID associated with the PC5 unicast link ID, a destination L2 ID associated with the PC5 unicast link ID, an ALID of a source UE associated with the PC5 unicast link ID, and/or an ALID of a destination UE associated with the PC5 unicast link ID. For example, the information about the PC5 unicast link may include all of the above information.

For example, upon receipt of a report of an indication including the information about the PC5 unicast link associated with the PC5 RRC connection determined to be released by the AS layer of the UE from the AS layer of the UE, the higher layer of the UE may release a PC5-S connection associated with the PC5 unicast link ID. That is, the higher layer may release the PC5 unicast link or connection associated with the PC5 RRC connection. After releasing the PC5 unicast link, the higher layer of the UE may indicate to the AS layer of the UE to release the PC5 RRC connection associated with the PC5 unicast link. When indicating to the AS layer of the UE to release the PC5 RRC connection, the higher layer of the UE may transmit information about the PC5 unicast link to the AS layer of the UE. Upon receipt of the indication to release the PC5 RRC connection from the higher layer of the UE, the AS layer of the UE may release the PC5 RRC connection associated with the PC5 unicast link.

In another example, when the AS layer of the UE determines to release a PC5 RRC connection for a PC5 unicast link for a reason other than PC5 RLF, the AS layer of the UE may transmit a "PC5 RRC connection release request" message including information about the PC5 unicast link associated with the PC5 RRC connection determined to be released to the BS. The reason other than PC5 RLF has been described before.

Further, the information about the PC5 unicast link may be, for example, an ID identifying the PC5 unicast link uniquely. For example, the information about the PC5 unicast link may include at least one of a PC5 unicast link ID, a source L2 ID associated with the PC5 unicast link ID, a destination L2 ID associated with the PC5 unicast link ID, an ALID of a source UE associated with the PC5 unicast link ID, and/or an ALID of a destination UE associated with the PC5 unicast link ID. For example, the information about the PC5 unicast link may include all of the above information. For example, the "PC5 RRC connection release request" message may be transmitted in an RRC message. For example, the RRC message may be a Sidelink UE Information message or a new RRC message.

Upon receipt of the "PC5 RRC connection release request" message including the information about the PC5 unicast link from the UE, the BS may determine to release the PC5 RRC connection of the UE. For example, when determining to release the PC5 RRC connection of the UE, the BS may transmit a "PC5 RRC connection release confirm" message to the UE. The "PC5 RRC connection release confirm" message may include information about the PC5 unicast link associated with the PC5 RRC connection determined to be released by the BS. For example, after transmitting the "PC5 RRC connection release confirm" message, the BS may release all of radio resources associated with the PC5 unicast link. For example, the radio resources may include mode 1 resources and/or mode 2 resources. For example, the mode 1 resources may be resources that the BS has allocated to the UE, for SL communication, and the mode 2 resources may be resources that the UE has allocated or selected for the SL communication.

In another embodiment, when the higher layer of the UE determines not to configure any more NR SL transmission configuration or any more NR SL reception configuration, the AS layer of the UE may transmit, to the BS, a Sidelink UE Information message or RRC message including information about the PC5 unicast link determined by the higher layer, so that the AS layer of the UE may not perform a transmission and a reception related to NR SL. For example, the information about the PC5 unicast link may be an ID that uniquely identifies the PC5 unicast link. For example, the information about the PC5 unicast link may include at least one of a PC5 unicast link ID, a source L2 ID associated with the PC5 unicast link ID, a destination L2 ID associated with the PC5 unicast link ID, an ALID of a source UE associated with the PC5 unicast link ID, and/or an ALID of a destination UE associated with the PC5 unicast link ID. For example, the information about the PC5 unicast link may include all of the above information.

For example, upon receipt of the Sidelink UE Information message including the information about the PC5 unicast link from the UE, the BS may release all AS contexts related to the PC5 unicast link identified by the PC5 unicast link ID included in the Sidelink UE Information message. Further the BS may release all of radio resources associated with the PC5 unicast link. For example, the radio resources may include mode 1 resources and/or mode 2 resources. For example, the mode 1 resources may be resources that the BS has allocated to the UE, for SL communication, and the mode 2 resources may be resources that the UE has allocated or selected for the SL communication.

Figure 15:
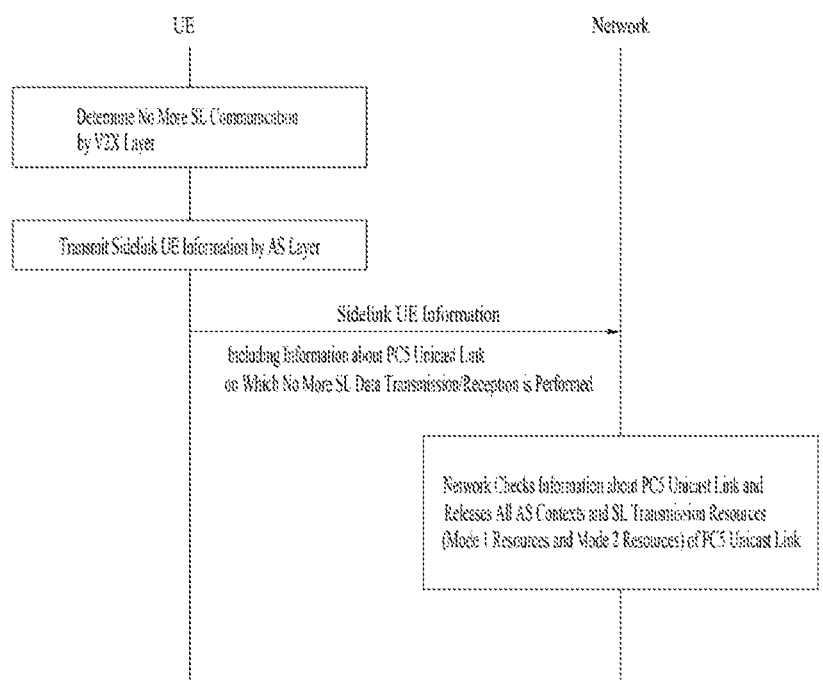

FIG. 15 illustrates a method of, when a UE determines not to conduct SL communication any longer, transmitting, to a BS, a Sidelink UE Information message including information about a PC5 unicast link on which the UE will not transmit/receive SL data any longer by the UE, so that the BS releases radio resources from the UE.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
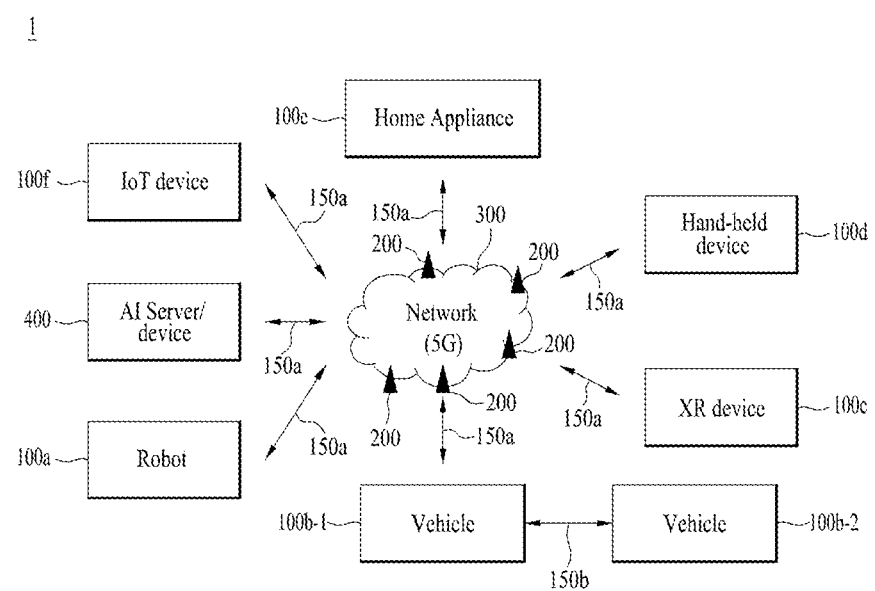
FIGS. 16, 17, 18, 19, 20, 21, and 22 are diagrams illustrating various devices to which embodiment(s) is applicable.

FIG. 16 illustrates a communication system 1 applied to the present disclosure.

Referring to FIG. 16, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/ the wireless devices may transmit/receive radio signals to/from each other through the wireless communication/ connections 150a and 150b. For example, the wireless communication/connections 150a and 150b may transmit/ receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 17:
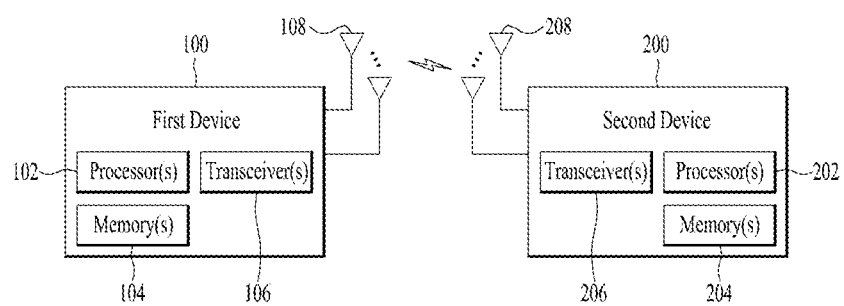

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
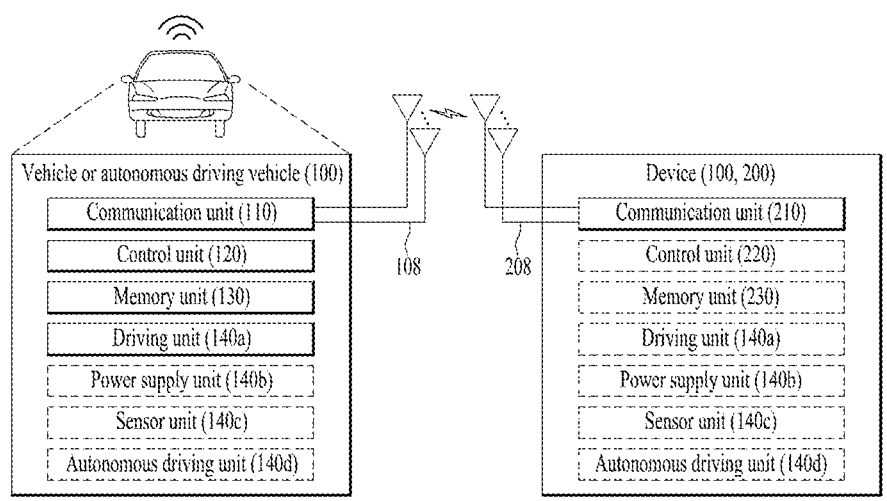

Examples of a Vehicle or an Autonomous Driving Vehicle Applicable to the Present Disclosure FIG. 18 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 18, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 19:
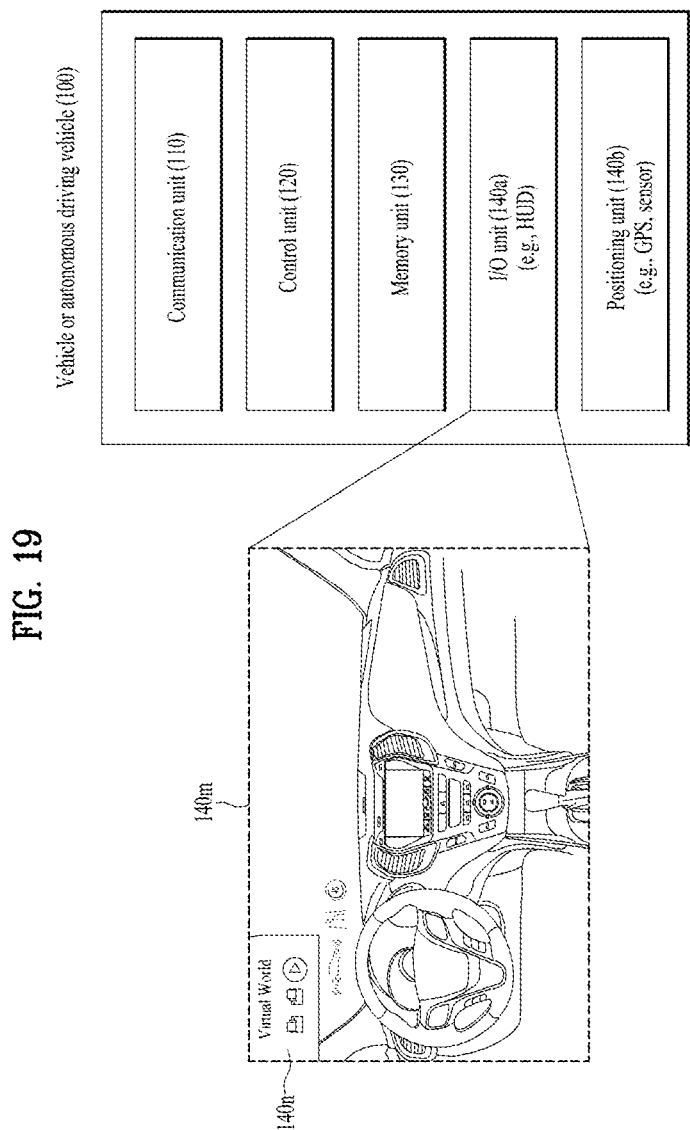

FIG. 19 illustrates a vehicle applied to the present disclosure. The vehicle may be implemented as a transport means, an aerial vehicle, a ship, etc.

Referring to FIG. 19, a vehicle 100 may include a communication unit 110, a control unit 120, a memory unit 130, an I/O unit 140a, and a positioning unit 140b.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 20:
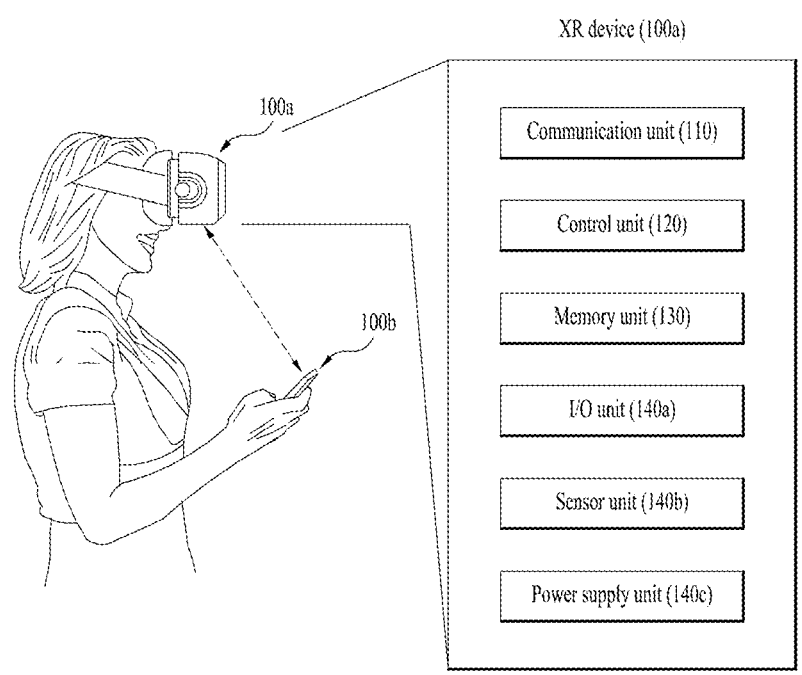

FIG. 20 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 20, an XR device 100a may include a communication unit 110, a control unit 120, a memory unit 130, an I/O unit 140a, a sensor unit 140b, and a power supply unit 140c.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of a Robot Applicable to the Present Disclosure

Figure 21:
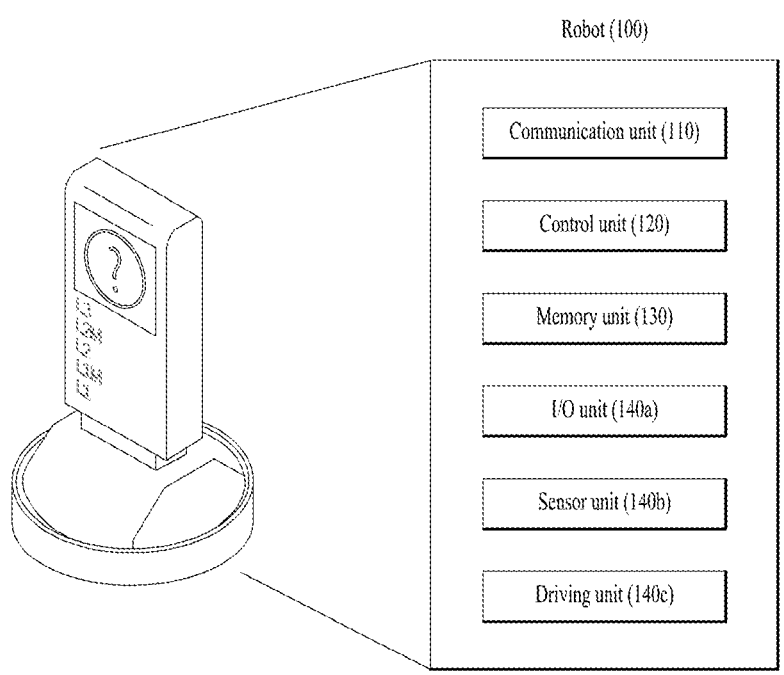

FIG. 21 illustrates a robot applied to the present disclosure. The robot may be categorized into an industrial robot, a medical robot, a household robot, a military robot, etc., according to a used purpose or field.

Referring to FIG. 21, a robot 100 may include a communication unit 110, a control unit 120, a memory unit 130, an I/O unit 140a, a sensor unit 140b, and a driving unit 140c.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Example of AI device to which the present disclosure is applied.

Figure 22:
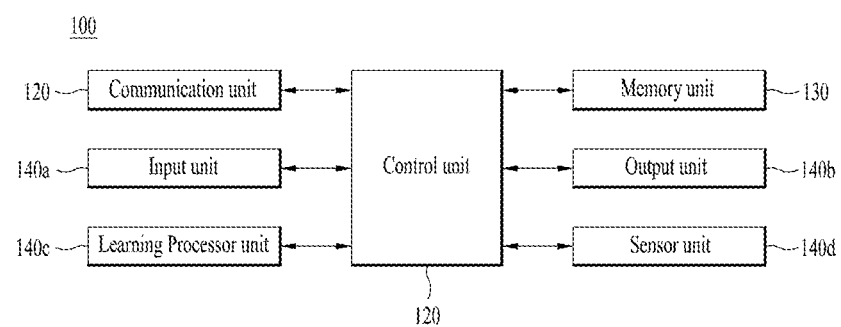

FIG. 22 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 22, an AI device 100 may include a communication unit 110, a control unit 120, a memory unit 130, an I/O unit 140a/140b, a learning processor unit 140c, and a sensor unit 140d.

The communication unit 110 may transmit and receive wired/radio signals (e.g., sensor information, user input, learning models, or control signals) to and from external devices such as other AI devices (e.g., 100x, 200, or 400 of FIG. 16) or an AI server (e.g., 400 of FIG. 16) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 16). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 16). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

The above-described embodiments of the present disclosure are applicable to various mobile communication systems.

As is apparent from the foregoing description, according to an embodiment of the present disclosure, when an AS configuration is failed, a BS may accurately identify a related link and release related resources. Therefore, resources may be efficiently managed.

The above-described embodiments of the present disclosure are applicable to various mobile communication systems.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method of operating a first user equipment (UE) in a wireless communication system, the method comprising:
   establishing, by the first UE, a plurality of PC5 unicast links with a second UE;
   performing, by the first UE, an access stratum (AS) configuration procedure with a second UE, wherein the plurality of PC5 unicast links are related to a plurality of PC5 radio resource control (RRC) connections; and
   transmitting, by the first UE to a base station, an RRC message based on failure of the AS configuration procedure,
   wherein the RRC message includes information about a destination identifier (ID) of a second PC5 unicast link related to the failure of the AS configuration procedure, and
   wherein based on sidelink (SL) radio link failure (RLF):
      an AS layer of the first UE informs a vehicle-to-everything (V2X) layer regarding a first PC5 unicast link related to a first PC5 RRC connection by a PC5 unicast link ID indicating the first PC5 unicast link for which the SL RLF has been declared, and
      the V2X layer of the first UE releases the first PC5 unicast link related to the first PC5 RRC connection based on the PC5 unicast link ID.

2. The method according to claim 1, wherein, based on AS configuration failure, the first UE releases a second PC5 RRC connection from the second UE.

3. The method according to claim 1, wherein the RRC message is SidelinkUEInformation.

4. The method according to claim 1, wherein the information about the destination ID corresponds to the second UE.

5. A first user equipment (UE) configured to operate in a wireless communication system, the first UE comprising:
   at least one processor; and
   at least one computer memory operatively coupled to the at least one processor and storing instructions which when executed, cause the at least one processor to perform operations,
   wherein the operations comprise:
   establishing a plurality of PC5 unicast links with a second UE;
   performing an access stratum (AS) configuration procedure with a second UE, wherein the plurality of PC5 unicast links are related to a plurality of PC5 radio resource control (RRC) connections; and
   transmitting an RRC message to a base station (BS) based on failure of the AS configuration procedure,
   wherein the RRC message includes information about a destination identifier (ID) of a second PC5 unicast link related to the failure of the AS configuration procedure, and wherein based on sidelink (SL) radio link failure (RLF):
an AS layer of the first UE informs a vehicle-to-everything (V2X) layer regarding a first PC5 unicast link related to a first PC5 RRC connection by a PC5 unicast link ID indicating the first PC5 unicast link for which the SL RLF has been declared, and
the V2X layer of the first UE releases the first PC5 unicast link related to the first PC5 RRC connection based on the PC5 unicast link ID.

6. The first UE according to claim 5, wherein the first UE communicates with at least one of another UE, an UE or BS related to an autonomous driving vehicle, or a network.

7. A processor for performing operations for a first user equipment (UE) in a wireless communication system,
wherein the operations comprise:
establishing a plurality of PC5 unicast links with a second UE;
performing an access stratum (AS) configuration procedure with a second UE, wherein the plurality of PC5 unicast links are related to a plurality of PC5 radio resource control (RRC) connections; and
transmitting an RRC message to a base station (BS) based on failure of the AS configuration procedure,
wherein the RRC message includes information about a destination identifier (ID) of a second PC5 unicast link related to the failure of the AS configuration procedure, and
wherein based on sidelink (SL) radio link failure (RLF):
an AS layer of the first UE informs a vehicle-to-everything (V2X) layer regarding a first PC5 unicast link related to a first PC5 RRC connection by a PC5 unicast link ID indicating the first PC5 unicast link for which the SL RLF has been declared, and
the V2X layer of the first UE releases the first PC5 unicast link related to the first PC5 RRC connection based on the PC5 unicast link ID.

8. A non-volatile computer-readable storage medium storing at least one computer program, the at least one computer program including instructions which when executed by at least one processor, cause the at least one processor to perform operations for a first user equipment (UE),
wherein the operations comprise:
establishing a plurality of PC5 unicast links with a second UE;
performing an access stratum (AS) configuration procedure with a second UE, wherein the plurality of PC5 unicast links are related to a plurality of PC5 radio resource control (RRC) connections; and
transmitting an RRC message to a base station (BS) based on failure of the AS configuration procedure,
wherein the RRC message includes information about a destination identifier (ID) of a second PC5 unicast link related to the failure of the AS configuration procedure, and
wherein based on sidelink (SL) radio link failure (RLF):
an AS layer of the first UE informs a vehicle-to-everything (V2X) layer regarding a first PC5 unicast link related to a first PC5 RRC connection by a PC5 unicast link ID indicating the first PC5 unicast link for which the SL RLF has been declared, and
the V2X layer of the first UE releases the first PC5 unicast link related to the first PC5 RRC connection based on the PC5 unicast link ID.

* * * * *